United States Patent [19]  [11] Patent Number: 4,708,972
Long et al. [45] Date of Patent: Nov. 24, 1987

[54] STEAM RESISTANT MODIFIED POLYIMIDE FOAMS

[75] Inventors: John V. Long, El Cajon; John Gagliani, San Diego, both of Calif.

[73] Assignee: Imi-Tech Corporation, Elk Grove Village, Ill.

[21] Appl. No.: 879,033

[22] Filed: Jun. 26, 1986

[51] Int. Cl.$^4$ ............................................. C08J 9/22
[52] U.S. Cl. ................................. 521/185; 521/184; 521/189; 521/180; 528/188; 528/229; 528/321; 528/322; 528/324
[58] Field of Search ............... 521/180, 184, 185, 189; 528/188, 229, 321, 322, 324

[56] References Cited

U.S. PATENT DOCUMENTS 4,425,441 1/1984 Gagliani et al. .................... 521/185
4,426,463 1/1984 Gagliani et al. .................... 521/185
4,518,717 5/1985 Long et al. ......................... 521/185
4,539,336 9/1985 Long et al. ......................... 521/185
4,546,115 10/1985 Gagliani et al. ................... 521/185

Primary Examiner—Morton Foelak

[57] ABSTRACT

A composition and a process for the preparation of modified polyimide foams possessing outstanding resistance to high humidity environments which comprises the step of preparing a foamable composition by mixing a solution of an ester of benzophenonetetracarboxylic acid dianhydride and caprolactam with a polyamine to form a resin precursor which when heated foams contemporaneously with the polymerization of the reactants. Two solvents with different boiling points are used to produce a two phase system which yields spray dried powders completely free of the lower boiling point solvent.

19 Claims, No Drawings

STEAM RESISTANT MODIFIED POLYIMIDE FOAMS

BACKGROUND OF THE INVENTION

This invention relates to new compositions and process for the preparation of modified polyimide foams, possessing a density of 0.6 to 1.0 lb/ft$^3$, which are especially useful where resistance to moisture and flame is desirable. More specifically these foams can be used in adverse environments including steam pipe insulation and insulation of tanks with a steam pressure of 5–40 psi without degradation of the polymer chain.

The technology of the previous art is limited to the concept of selecting compositions and processes to form prepolymers which upon heating produce polyimide foams possessing the properties of resistance to high temperature and non-burning without emission of smoke.

The technology of the previous art, however, did not address the problem of durability of the foams at ambient and adverse conditions. These previous foams, when exposed to high humidity environments, which are encountered in normal use, start to decompose and become brittle and powdery. The result is that all the properties, including flammability properties, are degraded and the foams do not perform any longer in the applications they were originally intended for. This is a serious problem because these polyimide foams are now being considered for use in insulation of aircraft, naval vessels and other transportation vehicles, without the full knowledge that catastrophic failure of the insulation could occur after the polyimide foam is degraded.

The previous art is disclosed in, inter alias, U.S. Pat. Nos. 3,506,583, 3,726,831, 3,726,834, 4,070,312, 4,296,208, 4,305,796, 3,554,939, 3,554,935. These patents not only describe various methods for producing polyimide foams but also processes for scaling up by using spray drying and microwave heating techniques.

Although some patents allege that the foams produced are hydrolytically stable, standard tests proposed by the U.S. Navy show degradation when tested according to ASTM. Therefore, there is a definite need for a composition and a process for producing improved temperature and humidity resistant foams. The foams described can be prepared directly by heating a composition prepared by mixing a solution of an ester of benzophenonetetracarboxylic acid, caprolactam and a polyamine by using a solvent system comprising a low boiling point alcohol in combination with a higher boiling alcohol. The compositions and processes are fully described in the examples.

We believe that it is the caprolactam which imparts these unique properties to our product, but do not have a simple explanation. The use of caprolactam in modified polyimide products is not new. U.S. Pat. No. 3,238,181, issued Mar. 1, 1966 describes heat resistant polymers containing recurring cyclic imide groups connected by amide or ester linkages for making coatings. This patent discloses materials useful in our invention but does not disclose methods to produce foams.

Another invention made by one of the inventors of this application, U.S. Pat. No. 3,505,272 describes methods to make copolymer adhesive systems by reacting caprolactam with a dianhydride and a glycol.

U.S. Pat. Nos. 4,183,838 and 4,183,839 by the same inventor describe and claim useful coatings based upon the reaction of a dianhydride with caprolactam.

In all of the cited patents, which incorporate caprolactam, an N-substituted imide intermediate is formed by the reaction of the dianhydride with the caprolactam which is then polymerized with specific reactants to form specific end products. However, these processes and compositions will not produce foams. Therefore, a further need exists for a process which yields modified polyimide foams possessing a density in the range of 0.6 to 1.0 lb/ft$^3$, and resistance to steam and to high temperature and improved thermal insulating properties.

In the processes for the production of polyimide or modified polyimide resins now in use, the resin solution in a solvent is fed into a spray dryer and the powder resin is collected at the bottom of the dryer. Many resins, including polyimide and modified polyimide resins when spray dried from a single solvent system form a sticky powder due to the high concentration of wet resin in the powder granulates. The removal of the last traces of solvent from these wet powder resins is difficult and costly.

These wet powders must be dried in a thermal oven at relatively low temperature, in a microwave oven or in vacuum ovens to prevent polymerization. Moreover it is difficult to recover all the powder charged to the dryer due to physical losses during the operation. It is important that these powders be completely dried before they are processed to finished products or poor quality materials are obtained. The most important product produced from the polyimide precursor are polyimide foams.

The previous spray drying methods used to produce polyimide or modified polyimide precursors are disclosed, inter alia, in U.S. Pat. Nos. 3,506,583, 4,296,208, 4,305,796, 4,218,555, 4,255,313 and 4,251,418.

According to these previous disclosures it is possible to completely dry the resin precursors by using high inlet and high outlet temperatures during the spary drying process, however, when powders produced at these conditions are formed by thermal or microwave processes the resulting foams are extremely poor in quality. For an example, when the inlet and outlet temperatures of the spray dryer are 15° to 30° C. and 30° to 60° C. higher than the boiling point of the solvent to be evaporated, respectively, the resulting powder is very dry, but yields foams with large flaws throughout. We believe that powders produced at these conditions are partially polymerized and yield poor quality foams.

W. R. Boram, in U.S. Pat. No. 3,506,583 discloses that the liquid polyimide foam precursors in an alcohol solution can be spray dried since the solvents used have low boiling points and they do not require the use of catalytic solvents.

U.S. Pat. No. 4,296,208 discloses and claims a process of spray drying polyimide foam precursors in an alcohol solution and limits the outlet temperature to a maximum of 80° C. U.S. Pat. No. 4,305,796 also claims the use of spary drying the liquid polyimide precursor in an alcohol solution. The outlet temperature of the chamber being limited to 80° C. maximum. P. A. Antonopolos, in U.S. Pat. No. 4,218,555 claims the spray drying of modified polyimide resins precursors in an alcohol solution using the minimum amount of heat to vaporize all the solvent.

Similarly, U.S. Pat. Nos. 4,255,313, 4,251,418, 4,299,750 and 4,251,420 disclose the use of spray drying modified polyimide precursors in an alcohol solvent. These patents disclose spray drying processes of polyimide precursors that are completely different than that of the present invention and limit the outlet temperature of spray drying to 80° C. maximum. These precursors produce foams substantially different than those of the present invention in that the foams have poor hydrolytic stability and decompose in use.

The Antonopolos modified polyimide precursors are also different from those of the present invention and may or may not produce flexible foams upon heating

SUMMARY OF THE INVENTION

The deficiencies of these previous methods have been overcome in the present invention by producing a solution of the heat sensitive material in at least two solvents. One of the solvents must be such that the resin precursor is freely soluble in it. The second solvent is selected so that the resin precursor is insoluble in it. When using a combination of these two solvents, polyimide or modified polyimide resins can be spray dried at high inlet and outlet temperature and yield powders which are completely dry, stable at room temperature and yield flawless polyimides foams by heating in a microwave or thermal oven.

The deficiencies of the previous art have been overcome in accordance with the present invention which includes:

1. The reaction of a partial or full ester of benzophenonetetracarboxylic acid and caprolactam with polyamines in at least two solvents. One of the solvents is the solvent used for the esterification of the tetracarboxylic acid in which the resin precursor is fully soluble hereinafter called the principal solvent. The second solvent is a solvent in which the resin precursor is insoluble and which processes a higher boiling point than the principal solvent, and is hereinafter called the secondary solvent.

2. Drying the solution at sufficiently high temperatures in a spray dryer to completely dry the resin precursor the outlet temperature of the spray dryer being limited to 85° C. minimum.

3. Heating the dried precursor at a temperature at which foaming occurs contemporaneously with complete polymerization of the prepolymer.

DETAILED DESCRIPTION OF THE INVENTION

Any suitable aromatic dianhydride may be used in the preparation of the desired foams. Typical aromatic dianhydrides include those described and referenced in the patents listed above. Due to its ready availability and the excellent foams which result, 3,3', 4,4' benzophenonetetracarboxylic acid dianhydride (BTDA) is preferred. Any suitable oxoimine having

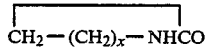

where "X" is a positive integer from 2 to 4 may be used. Typical oxoimines include those discloed in U.S. Pat. No. 4,426,463. Best results are obtained with caprolactam.

In order to produce a modified polyimide foam meeting the requirements for thermal stability, and resistance to steam we found that it is important that the ratio of the caprolactam to the dianhydride be in the range of about 0.2 to 1.0. Above this range the thermal stability and the flammability of the foams are adversely affected. The BTDA and caprolactam are added to an alcohol and the mixture is heated to esterify the tetraacid.

Any suitable alcohol which acts as an esterifying agent may be used. Best results have been obtained with methyl alcohol. Once the esterification is complete the diamines are added to the solution. Preferably, an approximately stoichiometric quantity of diamines is used. Both aromatic and aliphatic aromatic diamines may be used. The diamine may be entirely aromatic and the second diamine is aliphatic.

Typical aromatic and aromatic aliphatic diamines include 4,4 diaminodiphenyl methane, 4,4' diaminodiphenyl propane, 4,4' diaminodiphenyl oxide, m. phenylenediamine, 4,4' diaminodiphenyl sulfone, and 3,3' diaminodiphenyl methane. Of these best results are obtained with 4,4' diaminodiphenyl methane.

Typical aliphatic diamines include 1,4, diaminobutane, 1,6 diaminohexane, and 1,12 diaminododicane. Aliphatic diamines with up to 30 carbon atoms may be used.

After the reaction of the diamines the second solvent is added. The second solvent is selected from among those that have a higher boiling point than the principal alcohol and has the characteristic of being a very poor solvent for the liquid and powder resin precursor.

When methyl alcohol is used as the principal alcohol the second solvent may include propyl alcohol, isopropyl alcohol, methyl amyl alcohol, toluene, xylene, and chlorinated solvents. Optimum results have been obtained with a mixture of methyl alcohol and isopropyl alcohol.

Additives such as surfactants, blowing agents and plasticizers may be added if desired. Typical surfactants include silicone copolymers, fluorinated hydrocarbons, polyoxyethylene alcohols and derivatives, mono and diglicerides and alkyl aryl sulfonates.

The use of surfactants in polyimide and modified polyimide foams is disclosed, inter alia, in U.S. Pat. Nos. 5,562,189, 3,701,756, 3,489,696 and 3,554,939.

The final step of the process is carried out by recovering the solid powder precursor by evaporating the solvents from the solution using spray drying techniques. According to the present invention the precursor solution prepared as described above is fed continuously to an atomizing rotating wheel within a vessel wherein atomization of the solution is affected in a hot flow of rapidly moving air. The temperature of the hot air should be below 180° C. The vessel where evaporation occurs is maintained at low pressure of about 1.5 to 2.5 pound per square inch.

The evaporation of the two solvents occurs in a two-phase system which yield powders completely free of the primary alcohol. The hot air meets the resin droplets radiating from the atomizer and force the evaporation of the primary alcohol. At this time the powder still contains some of the higher boiling point alcohol. However, because the resin precursor is insoluble in the second alcohol, precipitation of the powder occurs concurrently with the evaporation process. The precipatated powder is only wet with the second solvent but none of it is retained in the powder itself. The precipitated powder leaves the vessel in an air stream heated at a temperature sufficiently high to cause the evaporation of the second solvent. The powder is collected at the bottom of a powder collector for further processing.

The temperature of the air stream when methyl alcohol is used as the primary alcohol is 85° C. minimum. The powder is placed in a mold and inserted in a microwave cavity operating at a powder of 10-100 KW. The powder melts and starts to foam with contemporaneous polymerization and curing to a foam material which is flexible, resilient, and stable in high temperatures and high humidity environments.

Details of the invention will be further understood upon reference to the following examples.

EXAMPLE I

About 146.6 g of BTDA (0.455M) and about 10.25 g of caprolactam (0.09M) are placed in a steel vessel and 494.0 g of methanol and 124.0 g of isopropanol are added. The mixture is heated to reflux (about 80° C.). Reflux is continued until the mixture appears clear, about 60 minutes. The end product is believed to be mixed half methyl and isopropyl esters of BTDA. The mixture is cooled to about 55° C. and about 85.6 g (0.432M) 4,4' diaminodiphenyl methane and about 2.60 g (0.02M) of 1,6 diamino hexane are added. The mixture is heated at 50°-55° C. for 30 minutes, then it is cooled to about 25°-30° C. A surfactant, 3.75 g of BRIJ-78 is added and the liquid resin is processed to a powder.

EXAMPLE II

The liquid resin of Example I is converted to a dry powder by feeding the resin continuously in a spray dryer with a dryer inlet temperature of 120° C.±1, an outlet temperature of 82°-84° C. and an atomizer speed of 18,400 rpm. The resin coats the wall of the spray dryer and does not dry.

EXAMPLE III

About 451.0 g of BTDA (1.4M) and 31.5 g of caprolactam (0.28M) are placed in a 12 L flask and about 410.0 g of isopropyl alcohol are added. The mixture is heated to reflux temperature (about 88° C.). Reflux is continued until the mixture appears clear. The product is a half isopropyl ester of BTDA. The mixture is cooled to 55° C. and about 263.5 g of 4,4' diaminodiphenyl methane (1.33M) and 8.0 g of 1,6 diaminohexane (0.069M) are added. The mixture is heated at 55° C. for 30 minutes, then it is cooled to about 25°-30° C. About 11.5 g of MYRJ-52-S, a surfactant, is added together with 714.0 g of methanol. The liquid resin is then processed to a powder.

EXAMPLE IV

The liquid resin of Example III is converted to a powder using a spray dryer with a dryer inlet temperature of about 140° C., an outlet temperature of 85°-90° C. and an atomizer speed of 18,400 rpm. The liquid resin forms a wet cake on the side of the dryer and does not dry to a powder.

EXAMPLE V

The experiment of Example III is repeated using BRIJ 78 surfactant in place of MYRJ-52-S. The liquid resin is converted to a powder using a spray dryer with an inlet temperature of 160° C., an outlet temperature of 110°-112° C. and an atomizer speed of 18,400 rpm. The liquid resin forms a wet cake on the side of the dryer and does not dry.

EXAMPLE VI

About 225.5 of BTDA (0.7M) and about 15.7 g of caprolactam (0.14M) are placed in a 12 L flask and about 357.0 g of methyl alcohol are added. The mixture is heated to reflux (about 75° C.). Reflux is continued until the mixture appears clear. The product is a half methyl ester of BTDA. The mixture is cooled to about 55° C. and 131.7 g of 4,4' diaminodiphenyl methane (0.665M) and 4.0 g of 1,6 diaminohexane (0.034M) are added. The mixture is heated at 50°-55° C. for 30 minutes, then it is cooled to about 25°-30° C. About 5.75 g of MYRJ-52-S is added. The liquid resin is then processed to a powder.

EXAMPLE VII

The liquid resin of Example VI is converted to a powder using a spray dryer with a dryer inlet temperature of 120° C., an outlet temperature of 81°-83° C. and an atomizer speed of 18,400 rpm. The dried powder is collected. The powder contains 18.1% volatiles and is very dusty. The powder is placed in a microwave oven at a power output of 30 KW. The powder foams and produces a flexible foam which is fully cured. The foam possessed many blowouts or flaws and is discarded.

EXAMPLE VIII

The experiment of Example VI is repeated except that the surfactant used is BRIJ-78 and the liquid resin is dried in a spray dryer at an inlet temperature of 120° C., an outlet temperature of 70°-71° C. and an atomizer speed of 18,400 rpm. The dry powder contains 20.3% volatiles and is significantly dusty. The powder cakes after 2 weeks in storage. The dried powder is collected and placed in a microwave oven at a power output of 30 KW. The powder foams and produces a flexible foam which is fully cured. The foam possesses several flaws and is cut into 1 inch thick slabs of various sizes. The slabs are cut so that any flaws present are avoided. The density of the foam is 0.55 lb/ft$^3$ (8.8 Kg/m$^3$). The foam is placed in a closed container and heated at a temperature of 120° C. and 35-40 psi steam for 5 hours. The foam maintains its resiliency and flexibility.

EXAMPLE IX

The experiment of Example VIII is repeated except that MYRJ-52-S surfactant is used in place of BRIJ-78. The foam possesses fewer flaws than that of Example VIII and a density of 0.73 lb/ft$^3$ (11.7 Kg/m$^3$). The foam maintains its resiliency and flexibility after exposure to the high pressure steam for 5 hours.

EXAMPLE X

About 225.0 g of BTDA (0.7M) and about 15.75 g of caprolactam (0.14M) are placed in a steel vessel and 310.0 g of methanol are added. The mixture is heated to reflux (75° C.) and refluxed until the mixture is clear. The product is a half methyl ester of BTDA. The mixture is cooled to about 51° C. and 131.8 g of 4,4' diaminodiphenyl methane (0.66M) and 4.0 g (0.034M) of 1,6 diaminohexane are added. The mixture is heated at 50°-55° C. for 1 hour and then cooled to about 25°-30° C. About 5.7 g of MYRJ-52-S, a surfactant, and 570 g of isopropanol are added and the liquid resin is processed to a powder.

EXAMPLE XI

The liquid resin of Example X is converted to a powder using a spray dryer with a dryer inlet temperature of 120° C. and an outlet temperature of 90°–91° C., and an atomizer speed of 18,400 rpm. The temperature of the liquid resin fed into the spray dryer is about 40°–55° C. The powder was collected at the bottom of the spray dryer. The powder contains 20.6% volatiles and is granular and non dusty. The powder remains free flowing in storage.

The powder is placed in a microwave at a power of 30 KW. The powder foams and produces a flexible resilient foam which is fully cured. The foam has no visible flaws, a density of 0.76 lb/ft³ (12.1 Kg/m³) and is stable in high pressure steam.

EXAMPLE XII

The experiment of Example XI is repeated except that 285.0 g of isopropyl is used. The liquid resin is spray dried at an inlet temperature of 120° C. and an outlet temperature of 89°–91° C. and an atomizer speed of 18,400 rpm. The powder contains 20.6% volatiles and is granular and non-dusty. The powder remains free-flowing in storage. The powder is foamed in a microwave oven at a power of 30 KW. The foam is flexible, resilient and free of flaws and imperfections. The density of the foam is 0.65 lb/ft³ (10.4 KG/m³).

EXAMPLE XIII

The experiment of Example X is repeated except that 18.3 g (0.14M) aminocaproic acid is used in place of caprolactam. The resin was processed according to the procedure of Example XI and produced a foam without flaws or imperfections. The foam possessed a density of 0.T5 lb/ft³ (12 Kg/m³).

We claim:

1. The method of making a flexible modified polyimide resin foam having resistance to high pressure steam and good mechanical properties which comprises the step of:

mixing together an aromatic dianhydride, a reagent selected from an oxoimine having

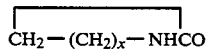

where "x" is a positive integer from 2 to 4, an amino acid or a mixture thereof, and an esterifying alcohol; in which the material produced by a spray drying step of this method is soluble; heating the mixture to a temperature of about 60° to 120° C. for about 30 to 90 minutes to produce an ester;
adding thereto at least one diamine;
adding thereto a second alcohol in which the material produced by a spray drying step of this method is insoluble;
drying the resulting solution in a spray dryer;
heating the resulting dry material above its melting point whereby a foam having high flexibility and resiliency and resistance to high pressure steam is produced.

2. The method according to claim 1 wherein the mole ratio of the oxoimine to dianhydride is about 0.2:1.

3. The method to claim 1 wherein the esterifying alcohol is a methyl alcohol and the second alcohol is isopropyl alcohol.

4. The method of claim 1 wherein the dianhydride is 3,3', 4,4', benzophenonetetracarboxylic acid dianhydride.

5. The method of claim 1 wherein the diamines are selected so that they are aromatic diamines with or without aliphatic moiety and when a second diamine is used the diamine is aliphatic.

6. The method of claim 5 wherein the aromatic or aliphatic aromatic diamine is selected from the group consisting of m. Phenylenediamine, p. Phenylenediamine, 4,4' diaminodiphenyl methane 4,4' diaminodiphenyl oxide, 4,4', diaminodiphenyl sulfone, 3,3' diaminodiphenyl methane, 3,3' diaminodiphenyl oxide, and 3,3' diaminodiphenyl sulfone.

7. The method of claim 5 wherein the aliphatic diamine is selected from the groups consisting of 1,4 diamino propane, 1.6 diamino hexane, and 1,8 diamino octane.

8. The method of claim 5 wherein the aliphatic aromatic diamine is 4,4 diaminodiphenyl methane.

9. The method of claim 5 wherein the aliphatic diamine is 1,6 diamino hexane.

10. The method of claim 1 wherein a surfactant is added.

11. The method of claim 10 wherein the surfactant is a polyoxyethylene ester.

12. The method of claim 11 wherein the polyoxyethylene chain of the polyoxyethylene ester contains from 5 to 250 repeating oxyethylene units.

13. The method of claim 11 wherein the acid moiety of the polyoxyethylene ester contains from 2 to 100 carbon atoms.

14. The method of claim 11 wherein the polyoxyethylene surfactant is polyoxyethylene stearate.

15. The method of claim 11 wherein the surfactant is spray dried.

16. The method of claim 1 wherein the inlet temperature of the spray dryer is about 120° to 140° C., the outlet temperature is about 85° to 105° C., the atomizer speed is about 18,400 rpm, and the temperature of the liquid resin is about 50° to 60° C.

17. The method of claim 1 wherein the powder resin is foamed in a microwave oven at a power output of about 3 to 70 KW.

18. The method of claim 3 wherein the ratio between the methanol and isopropanol is between about 1:0.3 and 1 to just above 0.

19. The method according to claim 1 wherein the heating of the dry precursor powder is carried out in a microwave oven at a power of about 10 to 70 KW whereby a flexible, resilient foam is obtained which is flexible and resilient without the need of a thermal cure cycle is flame resistant, does not burn and does not degrade or decompose in high steam environments of 5–40 psi.

* * * * *